E. D. PUTT.
TIRE STRIPPING MACHINE.
APPLICATION FILED MAY 25, 1920.
1,428,979.
Patented Sept. 12, 1922.
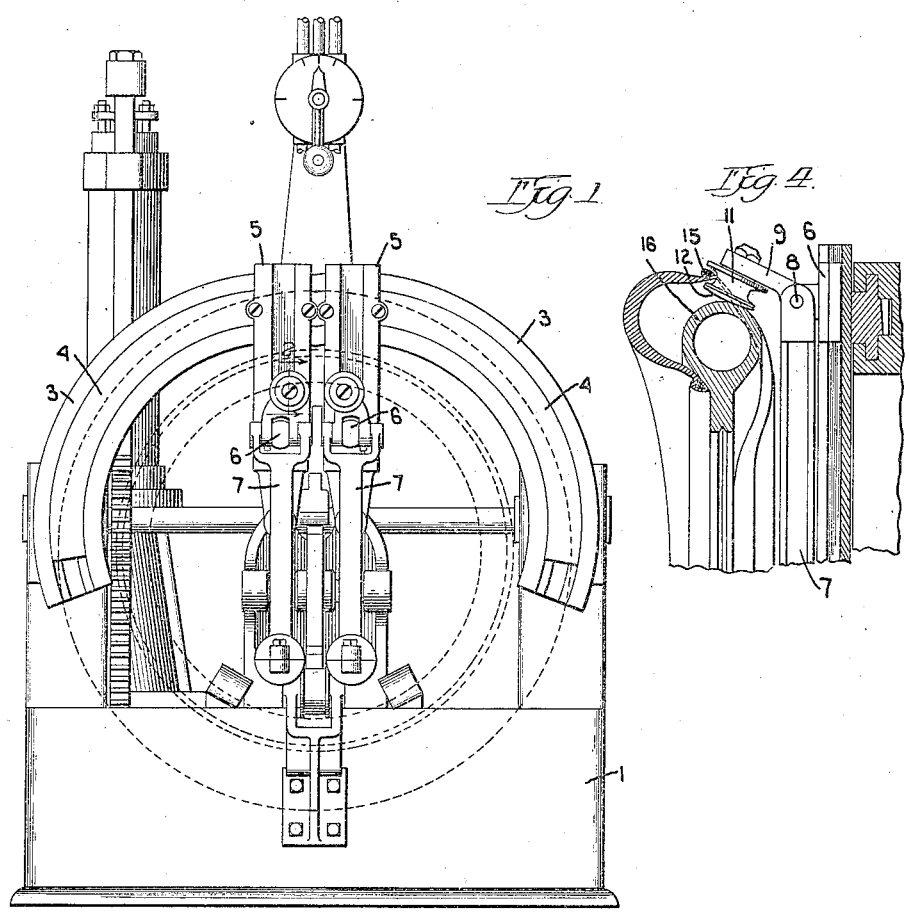
Fig. 1.
Fig. 4.
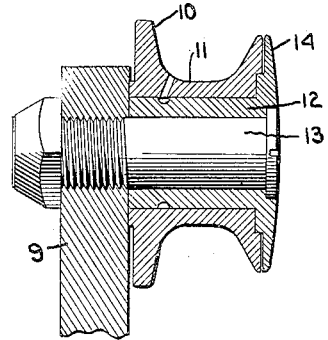
Fig. 2.
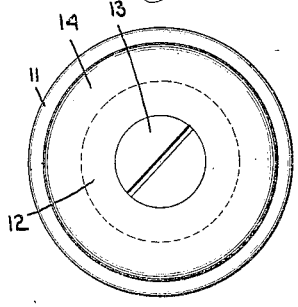
Fig. 3.
Witness:
Geo. E. Davison
Inventor.
Edward D. Putt
By G. L. Ely Atty.

Patented Sept. 12, 1922.

1,428,979

UNITED STATES PATENT OFFICE.

EDWARD D. PUTT, OF AKRON, OHIO, ASSIGNOR TO THE FIRESTONE TIRE AND RUBBER COMPANY, OF AKRON, OHIO, A CORPORATION OF OHIO.

TIRE-STRIPPING MACHINE.

Application filed May 25, 1920. Serial No. 384,095.

*To all whom it may concern:*

Be it known that I, EDWARD D. PUTT, a citizen of the United States, residing at Akron, in the county of Summit and State of Ohio, have invented certain new and useful Improvements in Tire-Stripping Machines, of which the following is a specification.

This invention relates to an improvement in machines for stripping clincher or extensible bead tires from the cores on which they are vulcanized and is designed particularly as an improvement in the type of stripping element shown in the patent to Charles W. Steele, No. 1,258,716, dated March 12, 1918.

The machine shown in the said patent has operated successfully in the stripping of tires, but it has been observed that frequently the bead edges are chafed and scored so that the tire is injured at this point. I have discovered the reason for this action on the part of the machine and have invented means to overcome it.

The means for removing the tire shown in the former machine constituted radially and circumferentially movable arms on the ends of which are rotatably mounted concave rollers or sheaves which engage the tire bead. As the tire removing arm rises over the core, the bead seats in the concave portion of the roller, but the edge of the bead at each side of the roller rides over the edge of the roller. When the arms carrying the rollers are separated or spread apart to strip the tire, each roller is rotated by contact of the edge or toe of the bead with the center or lowest point of the roller or sheave. But, it will be seen that the peripheral speed of the outer rim of the roller is greater than that of the center or lowermost point of the roller. The bead crosses the edge of the roller and as a result the faster peripheral speed of the edge of the roller causes it to scrape or abrade the edge of the tire.

In order to overcome this difficulty and disadvantage incident to tire stripping machines as heretofore constructed, I propose to construct the tire engaging element in two parts, independently rotative, one of said parts contacting the lowermost edge of the tire and forming the main body of the stripping roller and the other part forming the outer edge of the roller and contacting the bead.

A fuller description of the invention will follow as the description proceeds, it being understood that changes and modifications may be made within the scope of the present invention without sacrificing any of the benefits thereof.

Fig. 1 is a front elevation of the usual form of tire stripping machine.

Fig. 2 is an enlarged longitudinal section through one of the rollers.

Fig. 3 is a front elevation thereof.

Fig. 4 is a view showing the tire being stripped, illustrating the action of the bead in passing over the roller.

In the drawings accompanying this application is shown the tire stripping machine, the base of which is designated by the numeral 1, carrying two arc-shaped rails or guideways 3 in which are slidably mounted arc-shaped racks 4 to the upper ends of which are secured vertical or radial guideways 5. In these guideways 5 are slidably mounted shoes 6 actuated in any suitable or well-known manner by arms 7.

In the outer end of arms 7 are mounted on pivots 8, short, freely-swinging arms 9 which carry the stripping rollers 10. In the former types of machines this stripping roller or element has been made in one piece, either a shoe or a roller.

My improvement consists in making the roller 10 of two parts, a main roller 11 which is concaved and in which the tire bead rests, and a second roller 12. The roller 12 comprises a sleeve or hub rotatably mounted on a pin 13 secured in the end of arm 9, and a flange 14 which extends over the end of the roller 11. The roller 11 rides on and freely rotates about the hub or sleeve of the roller 12.

In the operation of the machine the core 16 carrying a vulcanized tire to be stripped is clamped in place on the machine. The arms 7, being in the position shown in Fig. 1 are moved outwardly radially, the rollers 10 picking up the bead 15, and moving it to the position shown in Fig. 4. When in this position, as shown in Fig. 4, the bead crosses over the edge of the roller riding on the flange 14. The arms are now separated or spread so as to move over the surface of the core and strip the tire. The bead rides on the roller 11 when it is seated in the lowermost part of the roller and on the flange 14 where it crosses over. As these parts are independently rotatable, each will rotate with the part which it contacts and there will be no tendency to scrape or injure the bead.

Other specific methods of constructing the bead may be devised which will answer the purposes of this invention and such as fall within the scope of the claims and do not depart from the spirit of this invention are to be considered within the purview of the appended claims.

I claim:

1. In a machine for the purpose of stripping tires, a tire stripping element movable over the core, said element comprising a part to engage the bead of the tire and an independently movable part over which the edge of the tire may run.

2. In a machine for the purpose of stripping tires, a tire stripping element movable over the core, comprising a roller, the body portion of which is concaved to receive the bead of the tire, the edge of the roller being freely rotatable with respect to the remainder of the roller.

3. In a machine for stripping tires, a tire removing element comprising a roller, the body portion of which is a roller freely rotatable, and the flange portion of which is formed as a separate element from the body portion and freely rotatable in respect thereto.

EDWARD D. PUTT.